United States Patent
Chang et al.

(10) Patent No.: US 11,121,880 B2
(45) Date of Patent: Sep. 14, 2021

(54) METHOD FOR REACHING CONSENSUS ON PUBLIC DISTRIBUTED LEDGERS AND SYSTEM USING THE SAME

(71) Applicant: CHUNGHWA TELECOM CO., LTD., Taoyuan (TW)

(72) Inventors: Ming-Che Chang, Taoyuan (TW); Pin-Jung Chiang, Taoyuan (TW); Keh-Hwa Shyu, Taoyuan (TW)

(73) Assignee: CHUNGHWA TELECOM CO., LTD., Taoyuan (TW)

( * ) Notice: Subject to any disclaimer, the term of this patent is extended or adjusted under 35 U.S.C. 154(b) by 451 days.

(21) Appl. No.: 16/133,757

(22) Filed: Sep. 18, 2018

(65) Prior Publication Data

US 2019/0379546 A1     Dec. 12, 2019

(30) Foreign Application Priority Data

Jun. 12, 2018  (TW) ................................ 107120181

(51) Int. Cl.
  *H04L 9/32* (2006.01)
  *G06Q 20/06* (2012.01)

(52) U.S. Cl.
  CPC ....... *H04L 9/3239* (2013.01); *G06Q 20/0658* (2013.01); *G06Q 2220/00* (2013.01); *H04L 2209/38* (2013.01)

(58) Field of Classification Search
  CPC combination set(s) only.
  See application file for complete search history.

(56) References Cited

U.S. PATENT DOCUMENTS

2018/0225640 A1 *  8/2018  Chapman ........... G06Q 20/0855

FOREIGN PATENT DOCUMENTS

| CN | 107743064 A | * | 2/2018 | ........... G06Q 20/382 |
| CN | 108009918 A | * | 5/2018 | ............. G06Q 40/04 |

* cited by examiner

*Primary Examiner* — Paul E Callahan
(74) *Attorney, Agent, or Firm* — Amin, Turocy & Watson, LLP

(57) ABSTRACT

A method for reaching consensus on public distributed ledgers and a system using the same are disclosed. The method includes: obtaining a random data of the last block of a blockchain; comparing the random data with an address of an account to obtain a degree of similarity; filtering accounts based on the degree of similarity; performing further filtering based on the account balance; performing ultimate filtering based on a combination of the account address and the random data; and determining an account that is entitled as the beneficiary to produce a new block to be attached to the last block of the blockchain. The present disclosure reaches consensus of generating a new block through multiple levels of filtering, thereby reducing the power consumption caused by large amounts of computations during the ordinary mining process, while significantly improving the efficiency of blockchain transactions and ensuring the fair distribution of mining rights.

13 Claims, 4 Drawing Sheets

METHOD FOR REACHING CONSENSUS ON PUBLIC DISTRIBUTED LEDGERS AND SYSTEM USING THE SAME

BACKGROUND

1. Technical Filed

The present disclosure relates to blockchain technology, and, more particularly, to a consensus technique for public distributed ledgers.

2. Description of Related Art

Consensus mechanism is necessary for a public and anonymous distributed ledger, such as the public blockchains used by Bitcoin or Ethereum, to safely operate globally, avoid double-spend problem of cryptocurrencies, and encourage users to participate in the signing and verification of new blocks.

Most of the consensus protocols used in the current public blockchains are called proof-of-work, which involves the continuously calculations of specific hash values by computers or devices to ensure the safety of the blockchain and fairness in block signing. This process is called mining as successful miners are rewarded with some cryptocurrencies. It can resolve the issue of competitions among the miners and maintain fairness of the production of the blocks. However, this approach consumes huge amounts of electricity during the mining process and brings about an impact on the ecological environment. The overall transaction speed of the blockchain using this approach is slow, and there is also the safety concern of a "51% attack." Further, the account receiving rewards in a new block is referred to as the beneficiary account hereafter.

To address the above issues, another consensus protocol called proof-of-stake was proposed. It does not require a lot of computing power and the cryptocurrency is mostly created in a pre-deterministic manner, so this way of generating new blocks is called forging instead of mining But this kind of consensus protocol has some security weaknesses: it is vulnerable to double-spending or similar attacks that rely on blockchain forks, bribe attacks, precomputing attacks, etc.; the person who originally holds the currency does not have the motivation to release the money to a third party; an attacker who has enough computing power can build another branch chain from scratch. As a result, proof-of-stake has not been able to replace the wide adoption of proof-of-work in public blockchains.

Therefore, there is a need in the related field for a solution that addresses the energy consumption, slow transaction speed and safety issues associated with the current consensus protocols.

SUMMARY

In order to solve the aforementioned and other shortcomings, the present disclosure provides a method for reaching consensus on public distributed ledgers, which may include: obtaining a random data from a last block of a blockchain; comparing the random data of the last block with an address of at least one account to obtain a degree of similarity; adjusting similarity score for zero-balance accounts; and allowing an account with a highest similarity to be entitled as the beneficiary to produce a new block to be attached to the last block of the blockchain.

In an embodiment, comparing the random data of the last block with an address of at least one account to obtain a degree of similarity may include: sequentially comparing a plurality of bytes of a hash value of the random data of the last block with a plurality of bytes of the address of the at least one account; and accumulating a weighted score if a byte of the hash value of the random data of the last block matches a corresponding byte of the address of the at least one account, else not to accumulate the weighted score, thereby an account with a highest weighted score being defined as the account with the highest similarity.

In an embodiment, comparing the random data of the last block with an address of at least one account to obtain a degree of similarity may include: adjusting the weighted score based on a balance of the at least one account and an occurrence number of previous blocks including the last block of the blockchain produced with a beneficiary account who has a zero balance.

In an embodiment, the method for reaching consensus on public distributed ledgers according to the present disclosure may further include: if several accounts have the highest similarity, obtaining each balance of each of the accounts having the highest similarity; and allowing the account with a highest balance being entitled as the beneficiary to produce a new block to be attached to the last block of the blockchain.

In an embodiment, the method for reaching consensus on public distributed ledgers according to the present disclosure may further include: if several accounts with the highest similarity have the same balance, calculating a characteristic value by each address of each of the accounts with the highest similarity having the same balance and the hash value of the last block; and allowing an account with a lowest characteristic value to be entitled as the beneficiary to produce a new block to be attached to the last block of the blockchain. In an embodiment, the characteristic value is a one-way hash value in cryptography.

In an embodiment, the method for reaching consensus on public distributed ledgers according to the present disclosure may further include: validating the address of the account in the early stage of consensus procedure.

In an embodiment, the method for reaching consensus on public distributed ledgers according to the present disclosure may further include: limiting a timestamp of the new block to be not earlier than an average timestamp of at least two previous blocks, or an interval between the timestamp of the new block and a system timestamp of the blockchain to be not greater than a predetermined time.

In order to solve the aforementioned and other shortcomings, the present disclosure also provides a system using a method for reaching consensus on public distributed ledgers, comprising: a plurality of blockchain nodes, each of which obtains a random data from a last block of a blockchain, and compares the random data of the last block with an address of an account proposed by blockchain nodes to obtain a degree of similarity; adjusting similarity score for zero-balance accounts; and an account with a highest similarity being entitled as the beneficiary to produce a new block to be attached to the last block of the blockchain.

Therefore, the present disclosure reaches consensus of generating a new block by multiple levels of filtering. The true random data possessed by the public blockchain is exploited to designate the account member entitled as the beneficiary to generate the next block, and the final legitimate block is determined based on factors such as distribution of rights, system safety, overall performance, etc. In this way, power consumption caused by large amount of computations during the mining process can be dramatically reduced, while significantly improving the efficiency of blockchain transactions and ensuring the fair distribution of mining rights.

DETAILED DESCRIPTION OF THE EMBODIMENTS

Throughout the descriptions and drawings of this specification, similar or identical numerals are used to refer to similar or the same elements/components/steps. Descriptions on elements/components/steps designated by the same numerals or using the same terms in different embodiments can be interchangeably referred to.

Figure 1A:
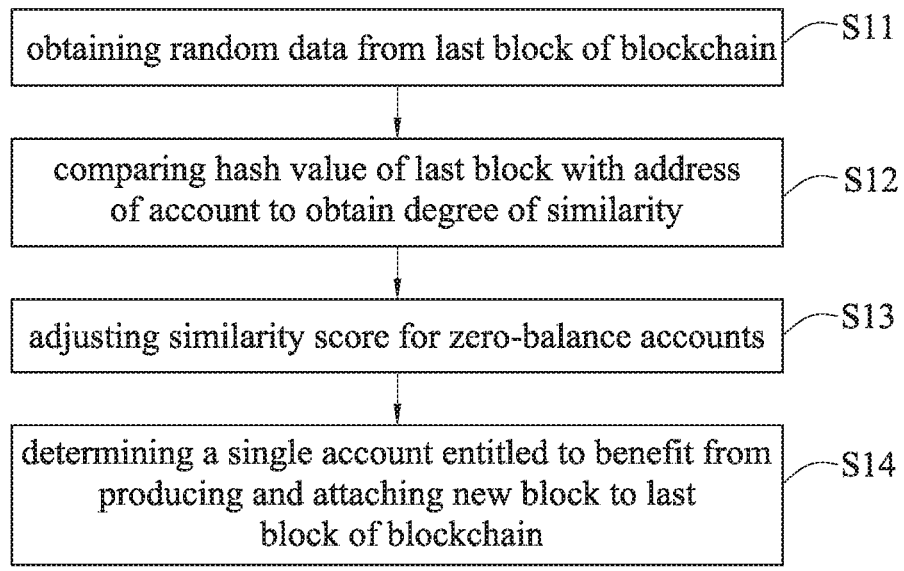
FIG. 1A is a flowchart illustrating a method for reaching consensus on public distributed ledgers in accordance with an embodiment of the present disclosure.

FIG. 1A is a flowchart illustrating a method for reaching consensus on public distributed ledgers in accordance with the present disclosure. The method may be applied to a blockchain node in a blockchain network. In an embodiment, the blockchain node is an application or a personal computer terminal program, or is a personal computer, a computer cluster, a mobile phone, a Tablet PC, a smart wearable device, a machine or other carrier, and the present disclosure is not limited thereto.

In step S11, a random data from a last block of a blockchain is obtained. The random data includes a hash value calculated using a hash algorithm. In cryptography, since a slightly different value at the input of a hash algorithm will result in a completely different output value, information, such as the transaction data, timestamp, block parameters, etc. included in each block of the blockchain will bring about unpredictable change in the hash value of a new block. Therefore, the hash value of the last block has a true random nature.

In step S12, the random data of the last block is compared with the address of an account to obtain a degree of similarity. In an embodiment, the calculation of the degree of similarity includes: a plurality of bytes of the hash value of the last block are sequentially compared with a plurality of bytes of the address of the account. If one of the bytes of the random data of the last block matches with a corresponding byte of the address of the account, a weighted score is accumulated. If the byte of the random data of the last block mismatches with the corresponding byte of the address of the account, the weighted score is not accumulated. The account associated with the highest weighted score is chosen as the account with the highest degree of similarity. A validating node of the consensus protocol also calculates its own similarity and participates in the comparison process, but broadcasts its block when other proposals have lower similarities.

In step S13, in order to resist the attack on the consensus protocol by creating a large number of accounts in advance, the weighted score is adjusted based on the balance of the account, especially for those accounts having a zero balance, such that the chance of a fraudulent account being chosen can be reduced.

In step S14, the account with the highest similarity is entitled as the beneficiary to attach a new block it has created to the last block of the blockchain. If several accounts have the highest similarity, then the balances of each of these accounts are obtained, and the account with the highest balance is entitled as the beneficiary to attach the created new block to the last block of the blockchain. If several accounts with the highest similarity also have the same balances, then a characteristic value is calculated by concatenating the address of the respective account to the hash value of the last block. The characteristic value is a new hash value of the concatenated result. The account with the lowest characteristic value is entitled as the beneficiary to attach a new block to the last block of the blockchain.

In addition, before step S12, the address of the account should be verified to prevent participants with bogus addresses from disrupting the consensus protocol and affecting the safety and efficiency of the blockchain. The verification of an address can be performed by regular consensus library or a third party open source software. In addition, the timestamp of the new block can be limited to be not earlier than the average of at least two (e.g., five) previous blocks in the blockchain, or the difference between it and the system timestamp of the blockchain to be not more than a preset time (e.g., two minutes).

Figure 1B:
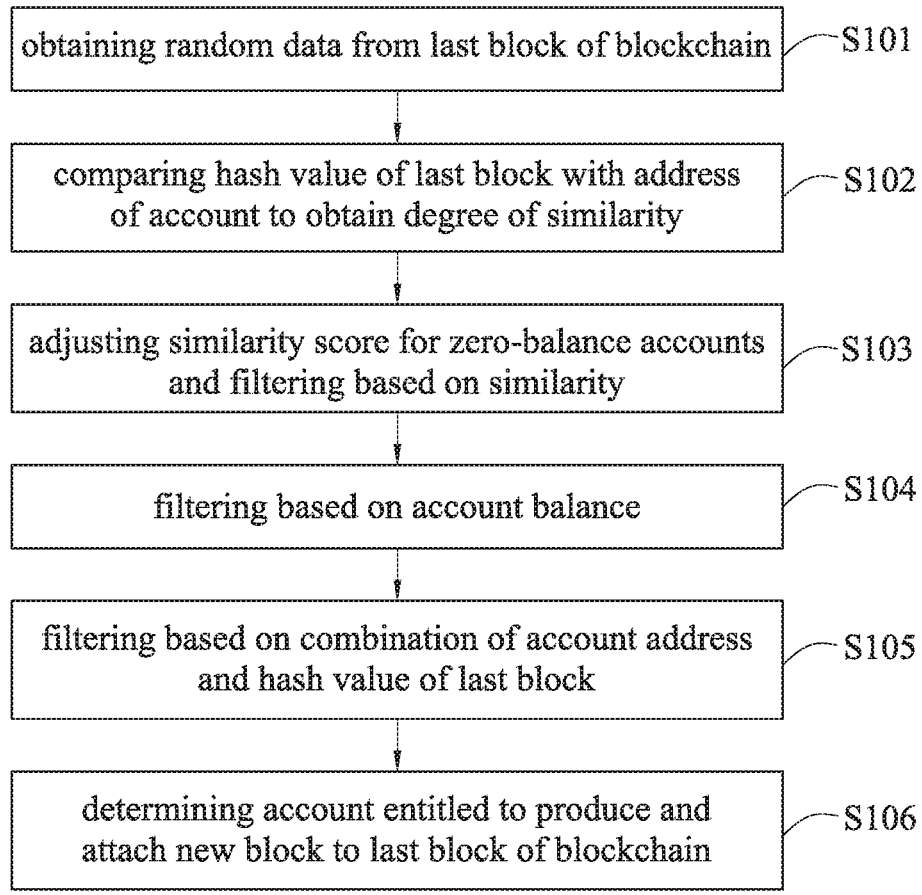
FIG. 1B is a flowchart illustrating a method for reaching consensus on public distributed ledgers in accordance with an embodiment of the present disclosure.

In other words, a consensus for producing a new block is achieved through multiple levels of filtering. As shown in the flowchart of FIG. 1B, the real random data included in the public blockchain itself is first used, i.e., the hash value of the last block on the blockchain is used for determining which account member will have the right to be rewarded by producing the next new block. As shown in step S101, the random data of the last block of the blockchain is obtained. Then, the final legitimate block is determined based on factors such as distribution of rights, system security, overall performance, etc.

The present disclosure assigns an account address the right to be rewarded by producing the next new block based on the real random data made public on a blockchain, thereby addressing the significant power consumption issue faced in proof-of-work consensus protocol while ensuring fairness of the distribution of rights to produce a new block. After random assignment, the disclosure is faced with a challenge: there is an immense amount of data that can correspond to a block hash value, so it is virtually impossible for any account to have an address that exactly matches that designated by the hash value. Therefore, the present disclosure performs partial comparison of hash value and accepts the account address with the highest similarity as the beneficiary of the new block. As such, similarity-based filtering is performed under the situations where multiple block signers compete to produce new blocks. As shown in step S102, the random data of the last block is compared with the address of an account to obtain a degree of similarity, and filtering is performed based on the degree of similarity.

The degree of similarity is calculated as follows. The address of an account is sequentially compared with the byes of the hash value of the last block. If the two have the same bytes in a specific location in a range defined by the system, then a weighted score $$S = \sum_{k=a}^{b} f(k)$$

is accumulated, where f(k) represents a value 1 if the two have the same bytes at location k, otherwise represents 0. The account with the highest similarity is the one with the highest score S. In order to resist attacks that produce large numbers of accounts in advance, the weighted scores S for accounts with an account balance of zero will be adjusted as shown in step S103. With the aforementioned two levels of filtering, a legitimate block signer may have been chosen, and consensus can be quickly reached. However, there may be several accounts with the highest similarity, and in this case, further filtering is needed.

In the further filtering process, the amount of currency held by an account is used for filtering. Those with less currency will be eliminated. As shown in step S104, filtering is performed based on the account balances. Such a balance-based filtering helps to reduce or eliminate attacks on the consensus protocol in that miners can increase their chances of getting chosen in the first random filtering process by creating a large number of accounts to participate in the production of blocks, but it would be too costly to maintain such a large amount of accounts with considerable account balances. This would deter some miners from making malicious attacks while increasing the willingness and chances of normal accounts in participating in block production.

However, if the selected accounts also have the same balances, then a final filtering is performed. As shown in step S105, the address of an account is combined with the hash data of the last block for filtering. In an embodiment, an account address is concatenated to the hash value of the last block, and a SHA256 hash value is calculated: H=SHA256 ($A+B_H$), wherein A is the account address and $B_H$ is the hash value of the last block. The account with the lowest H value would be chosen as the selected account that is entitled to be the beneficiary to make a new block. As shown in step S106, an account that is entitled as the beneficiary to attach a new block to the last block of the blockchain is determined.

Figure 2:
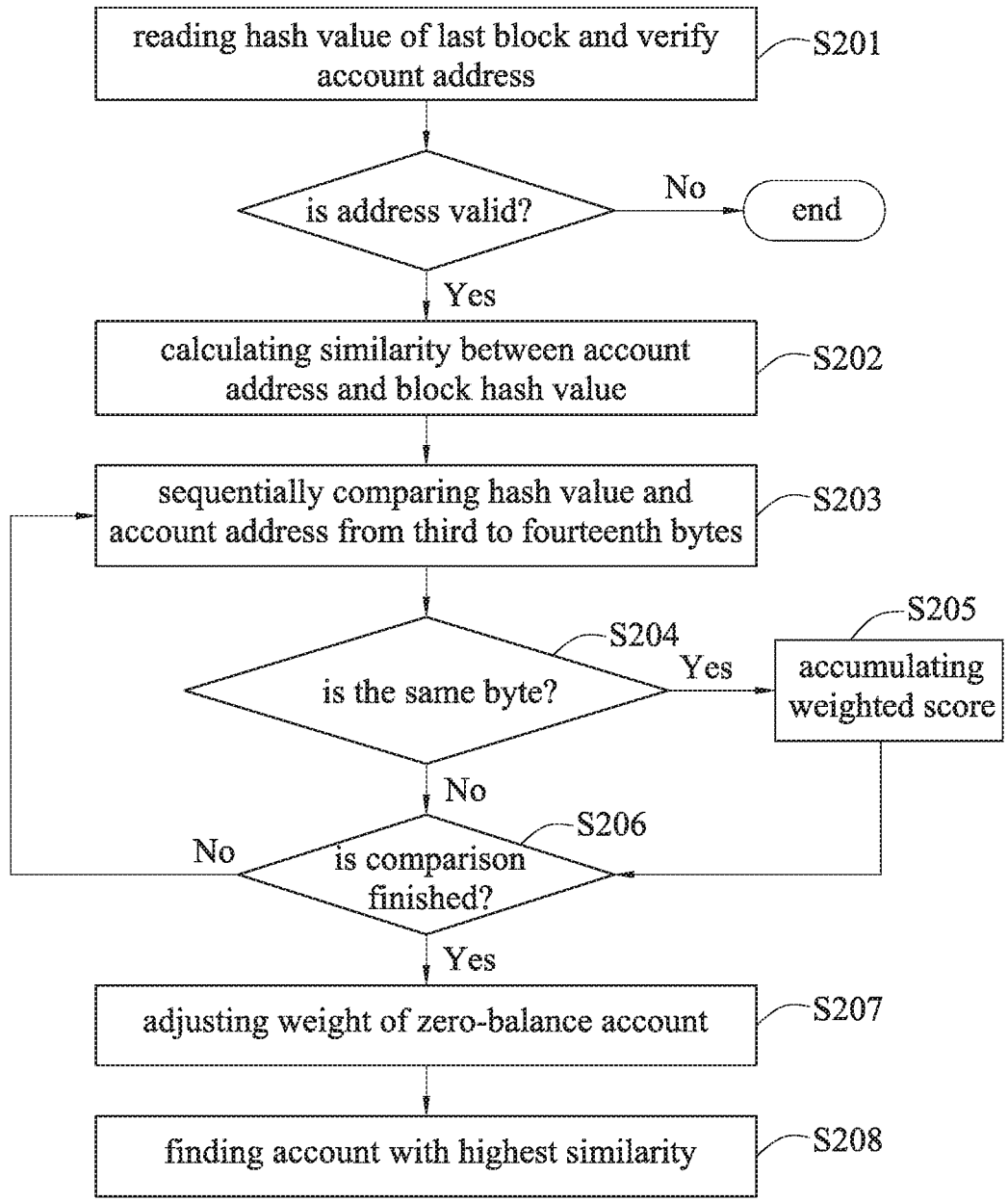
FIG. 2 is a flowchart illustrating filtering of a final account in the method for reaching consensus on public distributed ledgers in accordance with an embodiment of the present disclosure.

The present disclosure reaches a consensus for generating a new block via multiple levels of filtering, including processes such as: randomly selecting a beneficiary; performing filtering based on similarity; adjusting similarity score for zero-balance accounts; performing further filtering based on account balance; determining final legitimate block; etc. As shown in FIG. 2, a process for randomly selecting a beneficiary and performing filtering based on similarity is shown. First, each of the participants participating in the consensus of a public blockchain reads the hash value of the last block to be used as the basis for designating the account entitled as the beneficiary to creating the next new block, and then an account address is verified and similarity is compared, as shown in steps S201-S202. The account address is verified at the beginning to prevent malicious participants from disrupting the consensus by creating fraudulent addresses.

As shown in steps S203-S206, the degree of similarity of an address is calculated as follows. The address of an account is sequentially compared with the byes of the hash value of the last block within a comparison interval designated by the system. When the two have the same bytes in a specific location, then a weighted score $$S = \sum_{k=a}^{b} f(k)$$

is accumulated, wherein f(k) represents a value 1 if the two have the same bytes at location k, else it is 0; a and b indicate the comparison interval designated by the system, wherein the values of a and b are limited such that a<b, and b is smaller than the length of the blockchain address and also smaller than the length of the hash value of the last block. The encoding formats of the bytes of the account address and the hash value of the last block have to be made consistent to each other before comparison can take place. For example, Bitcoins uses Base58 for encoding the account address, then the hash value of the last block to be compared will also need to be converted into Base58 format, or preferably, both are decoded into byte array format before comparison is made. The verifying node in the consensus protocol will also calculate its own similarity to participate in the comparison process.

Next, assume a=3 and b=14, meaning that only the third to the fourteenth bytes (total of 12 bytes) of the hash value and the account address now having the same encoding format are compared, and the account with the highest score S is chosen as the account with the highest similarity. The reason why the comparison interval starts from the third bytes is to avoid preamble data of the account address. The amount of data covered by twelve of the Base58 encoded bytes is $1.45 \times 10^{21}$, or $7.9 \times 10^{28}$ for byte array format, and there are about 21,000,000 (or $2.1 \times 10^7$) active blockchain accounts globally according to statistics made at the end of 2017, which is much smaller than the comparison range. As a result, the addition of the similarity comparison step is needed in order to pick an account for creating a new block.

Moreover, in order to fend off attacks that create large amount of accounts in advance, in an embodiment as shown in step S207, the weighted score S for accounts with zero balances can be adjusted: $S=S \times f(Ba)$, wherein f(Ba) is a function having an account balance as the input (Ba), if the balance is zero, then 1 is returned; else (Wb+1)×2 is returned. Wb represents a block parameter that is calculated as the sum of the number of beneficiary accounts with a zero balance among the latest three blocks including the last block. For example, among the recent three previous blocks, only one of the beneficiary accounts has a zero balance, then Wb=1, so the function f(Ba) will return the value 4 (2×2) for accounts with balances greater than zero. By adjusting the weighted scores, the chances of mass-produced fraudulent accounts being selected can be lowered accordingly. Then, the account with the highest weighted score is chosen as shown in step S208. If several accounts come out of this filtering process having the highest similarity, then further filter process is needed.

Figure 3:
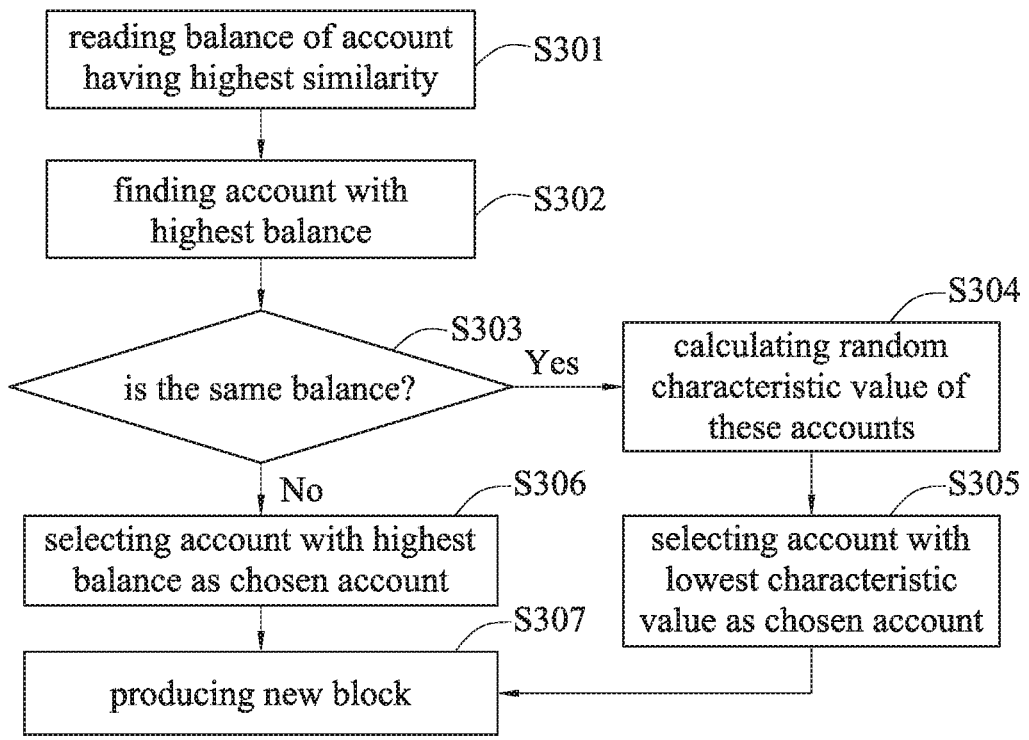
FIG. 3 is a flowchart illustrating filtering of a final account in the method for reaching consensus on public distributed ledgers in accordance with an embodiment of the present disclosure.

As shown in FIG. 3, a process for performing further filtering based on account balance and determining a final legitimate block is shown. When several accounts have the same highest S score, then further filtering is performed. First, the balances of these accounts with the highest similarity filtered out of the previous process are read, and then the amount of currency held by these accounts are evaluated, and those with less balances will be eliminated as shown in steps S301-302. If these remaining accounts have the same balance, then a final filtering step is carried out as shown in step S303-S306, in which the account address is concatenated to the hash value of the last block and a SHA256 hash value is calculated: H=SHA256 (A+$B_H$), wherein A is the account address; and $B_H$ is the hash value of the last block. The account with the lowest H value will be the final chosen account that is entitled as the beneficiary to produce a new block, as shown in step S307. The reason for using an algorithm that selects only a single account is that the consensus protocol is less likely to create forks, and a transaction does not require waiting for several blocks before it can be verified with confidence. Also, when several forks are produced on a blockchain, miners can instantly choose the best fork, thereby improving the overall transaction speed. In addition, in order to avoid a fork created as a result of an attacker retaining its blocks for later proposal in the subsequent consensus process, a time restriction mechanism for checking legitimate blocks is also added. For example, the interval between the timestamp at which a block is signed and the system timestamp should not be greater than a predetermined time (e.g., two minutes), or the timestamp of a new block should not be earlier than the average timestamp of at least two (e.g., 5) previous blocks. Therefore, the present disclosure is capable of achieving consensus of a public blockchain in a quick and fair manner, which overcomes the shortcomings of the prior art.

Figure 4:
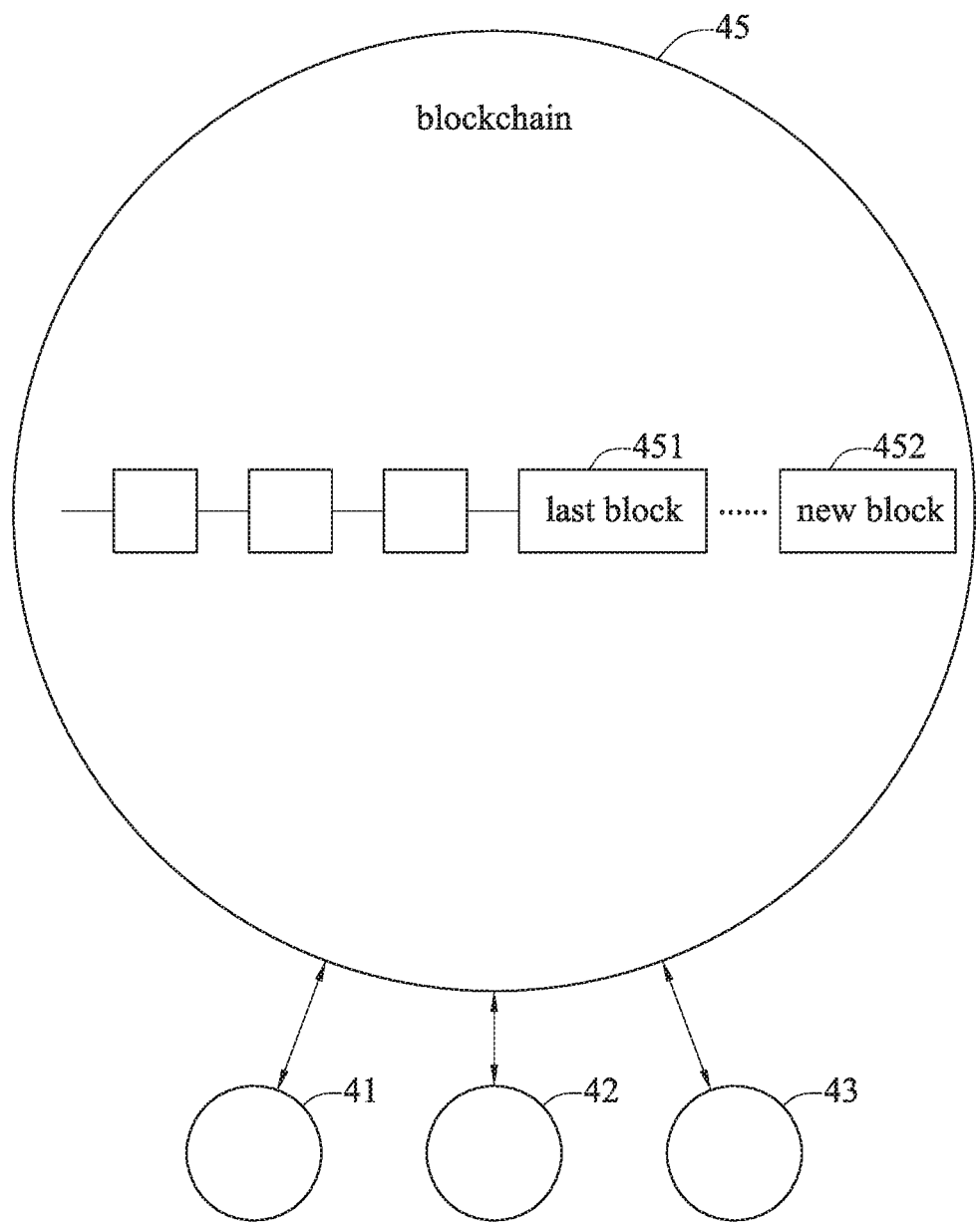
FIG. 4 is a schematic diagram depicting a system using the method for reaching consensus on public distributed ledgers in accordance with an embodiment of the present disclosure.

FIG. 4 is a schematic diagram depicting a system using the method for reaching consensus on public distributed ledgers in accordance with an embodiment of the present disclosure. The system includes: a plurality of blockchain nodes (e.g., 41, 42 and 43), wherein the blockchain node can be implemented as, for example, an application or a personal computer terminal program, or a personal computer, a cluster of computers, a mobile phone, a Tablet PC, a smart wearable device, a machine or other carrier, and the present disclosure is not limited thereto.

In addition, each of the blockchain nodes (41, 42, 43) obtains a random data from a last block 451 of a blockchain 45. Then, each of the blockchain nodes (41, 42, 43) compares the random data of the last block 451 with the address of the beneficiary account proposed by the blockchain nodes to obtain a degree of similarity. Finally, the node having an account with the highest similarity is entitled to produce a new block 452 that will be attached to last block 451 of the blockchain 45. Other details have been described above and will not be repeated again.

From a security perspective, since the proof-of-work algorithm is not used in the present disclosure, 51% attack is no longer an issue. In addition, the right to produce a new block will not depend on who has the most computational power. As for attacks like double-spend and the similar by blockchain forks, the attacker will need to produce several consecutive and legitimate blocks for the attack to work, but the selection process used in each block production in the consensus protocol of the present disclosure has true randomness and favors non-empty accounts, it would be difficult for an attacker to produce several consecutive legitimate blocks. As a result, the present consensus protocol can withstand such attacks. As for some of the safety issues associated with proof-of-stake protocol, since the present consensus protocol only uses the stake (currency held) as a secondary evaluating factor of the filtering process, these issues are not significant. However, some advantages of the proof-of-stake mechanism can still be maintained in that the attacks by creating large amounts of accounts can be deterred and the motivations of the malicious attackers can be reduced.

To summarize the above, the present disclosure does not consume huge quantities of computational resources for the consensus algorithm, thereby reducing power consumption and subsequently impact to our ecosystem. Moreover, a consensus mechanism suitable for public anonymous blockchains that fairly distributes the rights of mining is provided. Furthermore, new blocks can be produced quickly, enhancing the overall efficiency of transactions. The present consensus mechanism also has the ability to defend against malicious attacks, protecting the safe operations of the blockchains.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A method for reaching consensus on public distributed ledgers, comprising:
    obtaining a random data from a last block of a blockchain as a selection basis;
    comparing the random data of the last block with an address of at least one account to obtain a degree of similarity;
    allowing an account with a highest similarity to be entitled as a beneficiary to produce a new block to be attached to the last block of the blockchain; and
    determining a single account entitled to produce the new block by filtering qualified accounts,
    wherein comparing the random data of the last block with an address of at least one account to obtain a degree of similarity includes:
        sequentially comparing a plurality of bytes of a hash value of the last block with a plurality of bytes of the address of the at least one account; and
        accumulating a weighted score if a byte of the hash value of the last block matches a corresponding byte of the address of the at least one account, else not to accumulate the weighted score, thereby an account with a highest weighted score being defined as the account with the highest similarity.

2. The method of claim 1, wherein comparing the random data of the last block with an address of at least one account to obtain a degree of similarity further includes: adjusting the weighted score based on a balance of the at least one account and an occurrence number of previous blocks including the last block of the blockchain produced with a beneficiary account that has a zero balance.

3. The method of claim 1, further comprising:
    if several accounts have the highest similarity, obtaining each balance of each of the accounts having the highest similarity; and
    allowing an account with a highest balance being entitled as the beneficiary to produce a new block to be attached to the last block of the blockchain.

4. The method of claim 1, further comprising:
    if several accounts with the highest similarity have the same balance, calculating a characteristic value by each address of each of the accounts with the highest similarity having the same balance and the hash value of the last block; and
    allowing an account with a lowest characteristic value to be entitled as the beneficiary to produce a new block to be attached to the last block of the blockchain.

5. The method of claim 1, further comprising validating the address of the account.

6. The method of claim 1, further comprising limiting a timestamp of the new block to be not earlier than an average timestamp of at least two previous blocks, or an interval between the timestamp of the new block and a system timestamp of the blockchain to be not greater than a predetermined time.

7. The method of claim 1, further comprising making the random data of the last block to be in consistency in coding format with the address of the at least one account before comparing the random data of the last block with the address of the at least one account.

8. A non-transitory computer readable medium, comprising instructions which, when executed by a computer, cause the computer to implement a method for reaching consensus on public distributed ledgers, the method comprising:
obtaining, by each of a plurality of blockchain nodes, a random data from a last block of a blockchain, and comparing the random data of the last block with an address of an account proposed by the blockchain nodes to obtain a degree of similarity; and
allowing an account with a highest similarity to be entitled as a beneficiary to produce a new block to be attached to the last block of the blockchain,
wherein each of the blockchain nodes comparing the random data of a last block with an address of an account proposed by the blockchain nodes to obtain a degree of similarity includes:
validating the address of the account;
sequentially comparing a plurality of bytes of a hash value of the last block with a plurality of bytes of the address of the account proposed by the blockchain nodes; and
accumulating a weighted score if a byte of the hash value of the last block matches a corresponding byte of the address of the account proposed by the blockchain nodes, else not to accumulate the weighted score, thereby an account with a highest weighted score being defined as the account with the highest similarity.

9. The non-transitory computer readable medium of claim 8, wherein each of blockchain nodes comparing the hash value of the last block with an address of an account proposed by the blockchain nodes to obtain a degree of similarity includes: adjusting the weighted score based on a balance of the account and an occurrence number of previous blocks preceding the last block of the blockchain produced with a beneficiary account that has a zero balance.

10. The non-transitory computer readable medium of claim 8, wherein before the hash value of the last block is compared with the address of the account, the hash value of the last block is made to be in consistency in coding format with the address of the account.

11. The non-transitory computer readable medium of claim 8, wherein:
if several accounts have the highest similarity, each balance of each of the accounts having the highest similarity is obtained; and
an account having a highest balance is entitled as the beneficiary to produce a new block to be attached to the last block of the blockchain.

12. The non-transitory computer readable medium of claim 11, wherein:
if several accounts with the highest similarity have the same balance, a characteristic value is calculated by each address of each of the accounts with the highest similarity having the same balance and the hash value of the last block; and
an account with a lowest characteristic value is entitled as the beneficiary to produce a new block to be attached to the last block of the blockchain.

13. A method for reaching consensus on public distributed ledgers, comprising:
obtaining a random data from a last block of a blockchain;
comparing the random data of the last block with an address of at least one account to obtain a degree of similarity;
adjusting similarity score for zero-balance accounts; and
allowing an account with a highest similarity to be entitled to produce a new block to be attached to the last block of the blockchain.

* * * * *